United States Patent [19]

Sorensen

[11] Patent Number: 4,935,184
[45] Date of Patent: Jun. 19, 1990

[54] STABILIZED INJECTION MOLDING WHEN USING A COMMON MOLD PART WITH SEPARATE COMPLIMENTARY MOLD PARTS

[75] Inventor: Jens O. Sorensen, Rancho Santa Fe, Calif.

[73] Assignee: Primtec, Rancho Santa Fe, Calif.

[21] Appl. No.: 386,012

[22] Filed: Jul. 27, 1989

Related U.S. Application Data

[63] Continuation of Ser. No. 152,670, Feb. 5, 1988, abandoned.

[51] Int. Cl.$^5$ .............................................. B29C 45/16
[52] U.S. Cl. .................................... 264/246; 264/255; 264/328.8; 425/129.1
[58] Field of Search ............ 264/245, 246, 255, 328.1, 264/328.8, 328.11, 328.12; 425/127, 129.1, 130

[56] References Cited

U.S. PATENT DOCUMENTS

| | | | |
|---|---|---|---|
| 3,543,338 | 12/1970 | Cooper | 264/246 |
| 3,737,272 | 6/1973 | Segmuller | 425/248 |
| 3,832,110 | 8/1974 | Hehl | 425/130 |
| 4,381,275 | 4/1983 | Sorensen | 264/328.8 |
| 4,422,995 | 12/1983 | Schad | 425/129.1 |
| 4,459,256 | 7/1984 | Ziegler | 264/242 |
| 4,508,676 | 4/1985 | Sorensen | 264/328.8 |

FOREIGN PATENT DOCUMENTS 17577  1/1972  Australia .

OTHER PUBLICATIONS

Promat 100–100/100, Nestal.

Primary Examiner—Jill L. Heitbrink
Attorney, Agent, or Firm—Edward W. Callan

[57] ABSTRACT

A process for injection molding plastic products having a closed end and an open end with laminated walls terminating in a rim at the open end. A first common mold part is combined with a first complementary mold part to assemble a first mold cavity in which the first plastic material is injected until it reaches the portion of the first mold cavity that defines the rim of the product. Portions of the first complementary mold part contact portions of the first common mold part to rigidly secure the mold parts in position in relation to each other in order to impede movement of the mold parts in relation to each other during injection of a first plastic material into the first mold cavity. The first plastic material is shaped such that when it is contained after solidification in a second mold cavity it provides one or more stabilizing regions that rigidly secure the first common mold part in position in relation to the second complementary mold part in order to impede movement of such mold parts in relation to each other during the injection of a second plastic material into the second mold cavity. A second plastic material having different characteristics than the first plastic material is injected until it reaches the portion of the second mold cavity that defines the rim of the product to form a laminated wall.

10 Claims, 5 Drawing Sheets

STABILIZED INJECTION MOLDING WHEN USING A COMMON MOLD PART WITH SEPARATE COMPLIMENTARY MOLD PARTS

This is a continuation of co-pending application Ser. No. 07/152,670 filed on Feb. 5, 1988 now abandoned.

BACKGROUND OF THE INVENTION

The present invention generally pertains to injection molding of plastic products and is particularly directed to stabilizing the dimensions of mold cavities during the injection steps when using a common mold part and at least two complementary mold parts to assemble separate mold cavities for receiving separate injections of plastic materials to produce a thin-walled, hollow plastic product.

The use of a common mold part with at least two complementary mold parts to provide separate mold cavities for receiving separate injections of plastic materials for producing a hollow plastic product is known. In one known prior art method of cyclic injection molding a hollow plastic product, a first mold cavity is defined by a first common mold part and a first complementary mold part; and a second mold cavity is defined by the first common mold part and a second complementary mold part. The method includes the steps of:

(a) combining the first common mold part with the first complementary mold part to assemble the first mold cavity;

(b) injecting a first plastic material into the first mold cavity;

(c) solidifying the injected first plastic material to form a first plastic material component;

(d) combining the first common mold part with the second complementary mold part to assemble the second mold cavity with the first plastic material component attached to the first common mold part so that when the second mold cavity is assembled the first plastic material component is contained within the second mold cavity;

(e) injecting a second plastic material into the second mold cavity while the first plastic material component is contained therein; and (f) solidifying the injected second plastic material so as to form a second plastic material component that fuses with the first plastic material component to produce a hollow plastic product.

It also is known to expand upon this method by further using a third mold cavity defined by a second common mold part and the first complementary mold part, and a fourth mold cavity defined by the second common mold part and the second complementary mold part. The method further includes the steps of:

(h) during step (d), combining the second common mold part with the first complementary mold part to assemble the third mold cavity;

(i) during step (e), injecting a third plastic material into the third mold cavity;

(j) during step (f), solidifying the injected third plastic material to form a third plastic material component;

(k) during step (a), combining the second common mold part with the second complementary mold part to assemble the fourth mold cavity with the third plastic material attached to the second common mold part so that when the fourth mold cavity is assembled the third plastic material is contained within the fourth mold cavity;

(l) during step (b), injecting the fourth plastic material into the fourth mold cavity while the solidified third plastic material is contained therein; and (m) during step (c), solidifying the injected fourth plastic material so as to form a fourth plastic material component that fuses with the third plastic material to produce a second said hollow plastic product.

This method has been used for producing hollow plastic products having composite walls of separately injected plastic materials. In performing such method, the first plastic material is injected until it reaches the parting line between the first common mold part and the first complementary mold part; the second plastic material is injected until it reaches the parting line between the first common mold part and the second complementary mold part; the third plastic material is injected until it reaches the parting line between the second common mold part and the first complementary mold part; and the fourth plastic material is injected until it reaches the parting line between the second common mold part and the second complementary mold part.

Typically, all four plastic materials are the same.

SUMMARY OF THE INVENTION

The present invention provides a method and apparatus for injecting molding hollow, thin-walled plastic products, having a closed end and an open end with laminated walls terminating in a rim at the open end, where relative movement between the common mold part and the complementary mold parts is impeded during injection of the plastic materials.

According to the present invention, the first and second plastic materials have different characteristics, and in the injection molding method described above, the step of solidifying the injected first plastic material to form the first plastic material component (step (c)) includes the step of (g) shaping the first plastic material component such that when the first plastic material component is so contained in the second mold cavity the first plastic material component provides one or more stabilizing regions that rigidly secure the first common mold part in position in relation to the second complementary mold part in order to impede movement of the first common mold part in relation to the second complementary mold part during the injection of the second plastic material into the second mold cavity, to thereby produce a thin-walled plastic product having controlled dimension in that the wall-thickness dimensions of the second mold cavity are stabilized by the stabilizing regions.

The step of injecting the first plastic material into the first mold cavity (step (b)) includes the step of (h) injecting the first plastic material until it reaches the portion of the first mold cavity that defines the rim of the product; and the step of injecting the second plastic material into the second mold cavity (step (e)) includes the step of (i) injecting the second plastic material until it reaches the portion of the second mold cavity that defines the rim of the product.

When the method of the present invention utilizes two common mold cavities, such as described above, the step of solidifying the injected third plastic material to form the third plastic material component (step (j)) includes the step of shaping the third plastic material component such that when the third plastic material component is so contained in the fourth mold cavity the solidified third plastic material provides one or more stabilizing regions that rigidly secure the second common mold part in position in relation to the second complementary mold part in order to impede movement of the second common mold part in relation to the second complementary mold part during the injection of the fourth plastic material into the fourth mold cavity, to thereby produce a second thin-walled plastic product having controlled dimensions.

The method of the present invention may also be used for molding a product having a side wall including an approximately longitudinal strip that may be transparent to provide a transparent window in the side wall. This feature is particularly advantageous when it is desired to provide a longitudinal window in the side wall in order to monitor the level of a substance, such as a fluid, contained in the plastic product. In one embodiment, the first plastic material component is shaped to provide at least one stabilizing region that is transverse to a parting line between the first common mold part and the first complementary mold part, whereby the longitudinal strip is defined by the transverse stabilizing region. A transparent window is provided in the side wall by injecting a transparent first plastic material into the first mold cavity. A nontransparent second plastic material is injected into the second mold cavity to provide a nontransparent background for printing in the remainder of the side wall. In an alternative embodiment, the first plastic material component is shaped such that when the first plastic material component is contained in the second mold cavity, the second mold cavity defines at least one unfilled cavity region that is transverse to a parting line between the first common mold part and the second complementary mold part, whereby the longitudinal strip is defined by the unfilled transverse cavity region. In this embodiment, a transparent window is provided in the side wall by injecting a transparent second plastic material into the second mold cavity; and a nontransparent first plastic material is injected into the first mold cavity to provide a nontransparent background for printing in the remainder of the side wall.

In another aspect of the method of the present invention, the step of shaping the first plastic material component (step (g)) may further include the step of providing a first complementary mold part that is dimensioned in relation to the first common mold part such that when combined with the first common mold part to assemble the first mold cavity, portions of the first complementary mold part contact portions of the first common mold part to rigidly secure the first common mold part in position in relation to the first complementary mold part in order to impede movement of the first common mold part in relation to the first complementary mold part during the injection of the first plastic material into the first mold cavity.

The present invention further provides apparatus for performing the method of the present invention and hollow, thin-walled plastic products molded according to the method of the present invention.

Additional features of the present invention are described in relation to the description of the preferred embodiments.

BRIEF DESCRIPTION OF THE DRAWING

FIG. 1A is a top sectional view taken along lines A—A in FIG. 1B; and FIG. 1B is a side sectional view taken along lines B—B in FIG. 1A. FIGS. 1A and 1B further show the first plastic material injected into the first mold cavity.

FIG. 2A is a top sectional view taken along lines A—A in FIG. 2B; and FIG. 2B is a side sectional view taken along lines B—B in FIG. 2A. FIGS. 2A and 2B further show the first plastic material component contained in the second mold cavity and the second plastic material injected into the second mold cavity.

FIG. 5 also is a sectional view illustrating a product molded according to such alternative embodiment of the method of the present invention.

FIG. 7 also provides a sectional view of a product molded according to such further alternative embodiment of the method of the present invention.

DESCRIPTION OF THE PREFERRED EMBODIMENTS

Figure 1A:
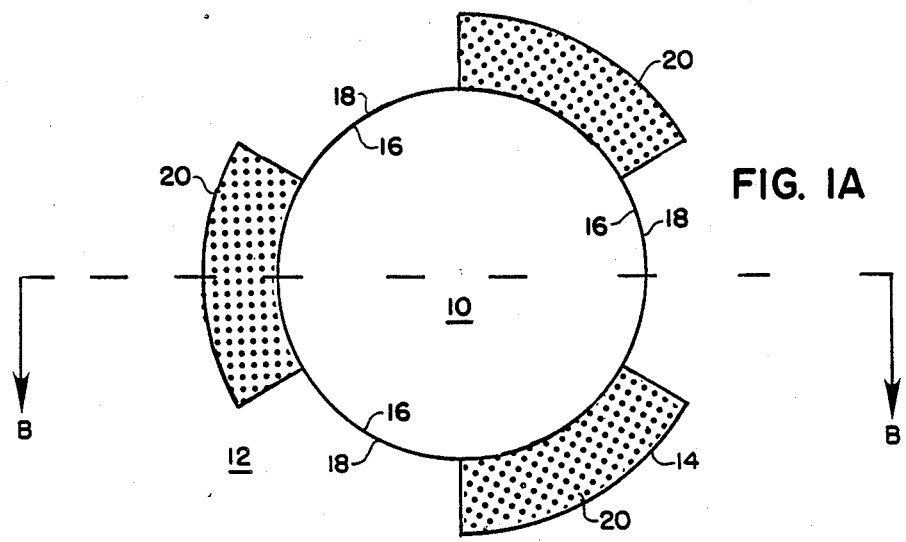
FIGS. 1A and 1B are sectional views illustrating a first mold cavity assembled by combining a first common mold part with a first complementary mold part.
Figure 1B:
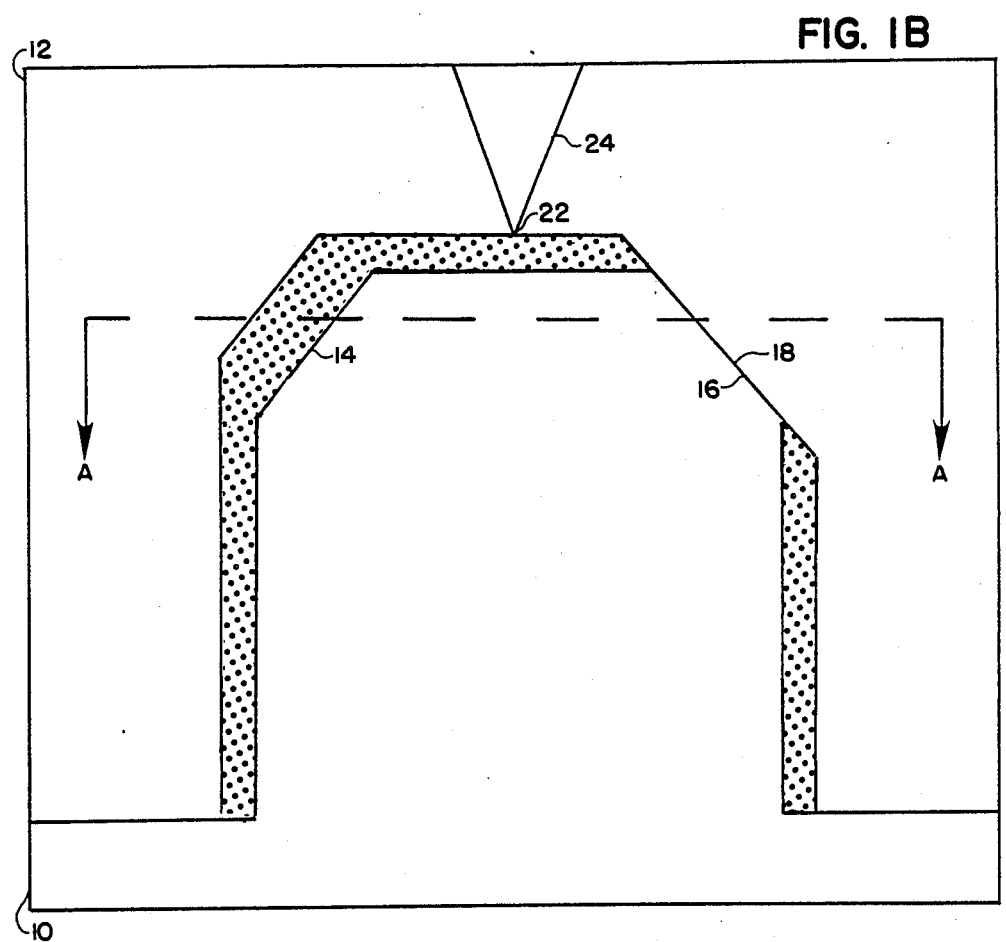

Referring to FIGS. 1A and 1B the apparatus of a preferred embodiment of the present invention includes a first common mold part 10 and first complementary mold part 12. The first common mold part 10 is combined with the first complementary mold part 12 to assemble a first mold cavity 14. The first complementary mold part 12 is dimensioned in relation to the first common mold part 10 such that when so combined with the first common mold part 10 to assemble the first mold cavity 14, portions 16 of the first complementary mold part 12 contact portions 18 of the first common mold part 10 to rigidly secure the first common mold part 10 in position in relation to the first complementary mold part 12 in order to impede movement of the first common mold part 10 in relation to the first complementary mold part 12 during injection of the first plastic material 20 into the first mold cavity 14. The first plastic material 20 is injected into the mold cavity 14 through a gate 22 and a runner 24 in the first complementary mold part 12.

The injected first plastic material 20 is solidified to form a first plastic material component 20 by cooling the injected first plastic material in the first mold cavity 14, whereby the first plastic material component 20 is shaped in accordance with the dimensions of the first mold cavity 14. In an alternative embodiment, the first plastic material component may be further shaped following removal of the first complementary mold part 12.

Figure 2A:
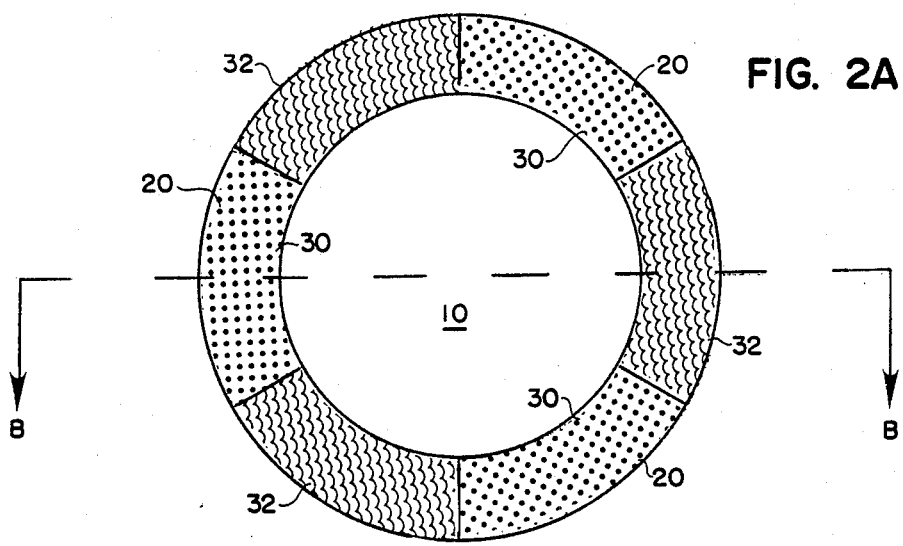
FIGS. 2A and 2B are sectional views illustrating a second mold cavity assembled by combining the first common mold part of FIGS. 1A and 1B with a second complementary mold part.
Figure 2B:
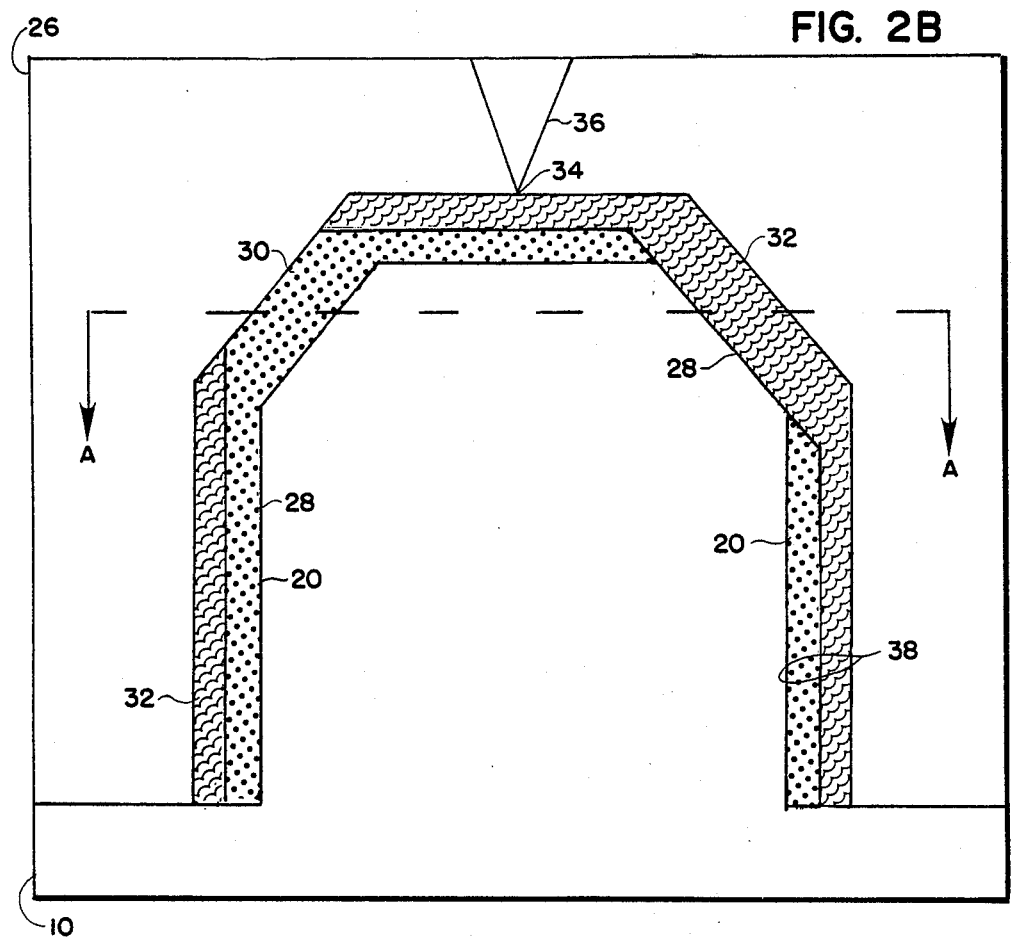

Referring to FIGS. 2A and 2B the apparatus of a preferred embodiment of the present invention includes a second complementary mold part 26. The first common mold part 10 is combined with the second complementary mold part 26 to assemble a second mold cavity 28 with the first plastic material component 20 attached to the first common mold part 10, so that when the second mold cavity 28 is assembled, the first plastic material component 20 is contained within the second mold cavity 28.

The first plastic material component 20 is shaped such that when the first plastic material component 20 is so contained in the second mold cavity 28 the first plastic material component 20 provides one or more stabilizing regions 30 that rigidly secure the first common mold part 10 in position in relation to the second complementary mold part 26 in order to impede movement of the first common mold part 10 in relation to the second complementary mold part 26 during the insertion of a second plastic material 32 into the second mold cavity 28.

The second plastic material 32 is injected into the second mold cavity 28 through a gate 34 and a runner 36 in the second complementary mold part 26 while the first plastic material component 20 is contained in the second mold cavity 28.

The injected second plastic material 32 is solidified by cooling in the second mold cavity 28 so as to form a second plastic material component 32 that fuses with the first plastic material component 20 to produce thin-walled hollow plastic product 38 having controlled dimensions.

A preferred embodiment of a method of cyclic injection molding of hollow, thin-walled plastic products according to the present invention, utilizing two common mold parts and two complementary mold parts to provide four mold cavities is described with reference to FIGS. 3A through 3D.

Figure 3A:
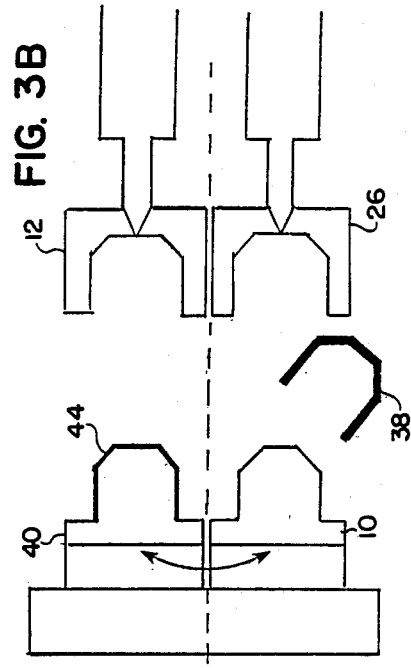
FIGS. 3A through 3D illustrate a series of steps in the performance of a preferred embodiment of the method of the present invention.

Referring to FIG. 3A, a second common mold part 40 is combined with the first complementary mold part 12 to assemble a third mold cavity 42; while at the same time the first common mold part 10 is combined with the second complementary mold part 26 to assemble a second mold cavity 28, with the first plastic material component 18 attached to the first common mold part 10, so that when the second mold cavity 28 is assembled, the first plastic material component 20 is contained within the second mold cavity 28. The formation of the first plastic material component 20 is discussed above in relation to FIGS. 1A and 1B.

A third plastic material 44, which may be the same as the first plastic material 20, is injected into the third mold cavity 42 through the gate 22 and the runner system 24 contained in the first complementary mold part 12; while at the same time, the second plastic material 32 is injected into the second mold cavity 28 through the gate 34 and a runner system 36 contained in the second complementary mold part 26.

The injected third plastic material 44 is solidified by cooling in the third mold cavity 42 to form a third plastic material component 44; while at the same time the injected second plastic material 32 is solidified by cooling in the second mold cavity 28 so as to form the second plastic material component 28 that fuses with the first plastic material component 20 to produce the hollow, thin-walled plastic product 38.

Figure 3B:
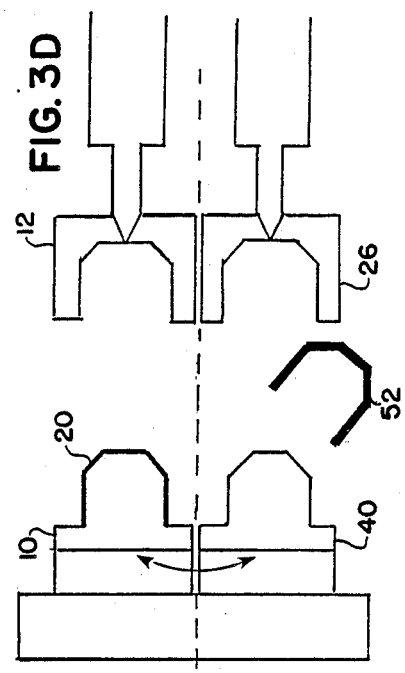

Referring to FIG. 3B, the first common mold part 10 and the second common mold part 40 are separated from the second complementary mold part 26 and the first complementary mold part 12 respectively; and the molded hollow, thin-walled plastic product 38 is ejected from first common mold part 10, while the third plastic material component 44 is retained on the third common mold part 40. The positions of the first common mold part 10 and the second common mold part 40 are then interchanged from those shown in FIG. 3B to those shown in FIG. 3C.

Figure 3C:
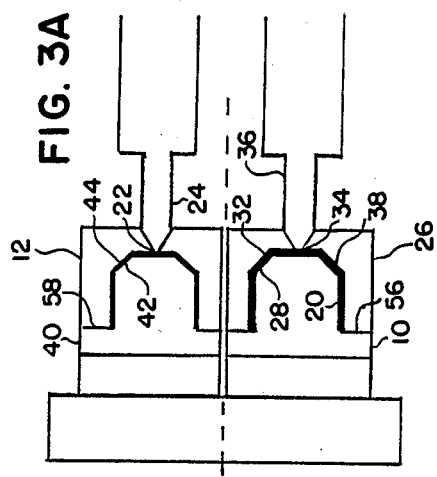

Referring to FIG. 3C, the first common mold part 10 is combined with the first complementary mold part 12 to assemble the first mold cavity 14; while at the same time the second common mold part 40 is combined with the second complementary mold part 26 to assemble a fourth mold cavity 48, with the first plastic material component 44 attached to the third common mold part 40, so that when the fourth mold cavity 48 is assembled, the third plastic material component 44 is contained within the fourth mold cavity 48. The formation of the third plastic material component 44 is discussed above in relation to FIG. 3A.

The first plastic material 20, which may be the same as the third plastic material 44, is injected into the first mold cavity 14 through the gate 22 and the runner system 24 contained in the first complementary mold part 12; while at the same time, a fourth plastic material 50, which may be identical to the second plastic material 32, is injected into the fourth mold cavity 48 through the gate 34 and a runner system 36 contained in the second complementary mold part 26.

The injected first plastic material 20 is solidified by cooling in the first mold cavity 14 to form another first plastic material component 20; while at the same time the injected fourth plastic material 50 is solidified by cooling in the fourth mold cavity 48 so as to form the second plastic material component 48 that fuses with the third plastic material component 44 to produce a second hollow, thin-walled plastic product 52.

Figure 3D:
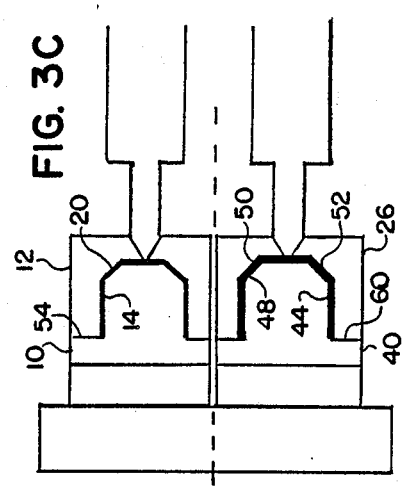

Referring to FIG. 3D, the first common mold part 10 and the second common mold part 40 are separated from the first complementary mold part 12 and the second complementary mold part 26 respectively; and the second molded hollow, thin-walled plastic product 52 is ejected from second common mold part 40, while the first plastic material component 20 is retained on the first common mold part 10. The positions of the first common mold part 10 and the second common mold part 40 are then interchanged from those shown in FIG. 3D to those shown in FIG. 3A, and the cycle is repeated.

As described above, the first plastic material component 20 is shaped such that when the first plastic material component 20 is contained in the second mold cavity 28, the first plastic material component 20 provides one or more stabilizing regions 30 that rigidly secure the first common mold part 20 in position in relation to the second complementary mold part 26 in order to impede movement of the first common mold part 10 in relation to the second complementary mold part 26 during injection of the second plastic material 32 into the second mold cavity 28.

Likewise, the third plastic material component 44 is shaped such that when the third plastic material component 44 is contained in the fourth mold cavity 48, the third plastic material component 44 provides one or more stabilizing regions that rigidly secure the second common mold part 40 in position in relation to the second complementary mold part 26 in order to impede movement of the second common mold part 40 in relation to the second complementary mold part 26 during injection of the fourth plastic material 50 into the fourth mold cavity 48.

The method described above with reference to FIGS. 3A through 3D may be used for producing hollow, thin-walled plastic products having laminated walls of different plastic materials. In performing such method, the first plastic material 20 is injected until it reaches a parting line 54 between the first common mold part 10 and the first complementary mold part 12 (FIG. 3C); and the second plastic material 32 is injected until it reaches a parting line 56 between the first common mold part 10 and the second complementary mold part 26 (FIG. 3A). Likewise, the third plastic material 44 is injected until it reaches a parting line 58 between the second common mold part 40 and the first complementary mold part (FIG. 3A); and the fourth plastic material 50 is injected until it reaches a parting line 60 between the second common mold part 40 and the second complementary mold part 26.

Figure 4:
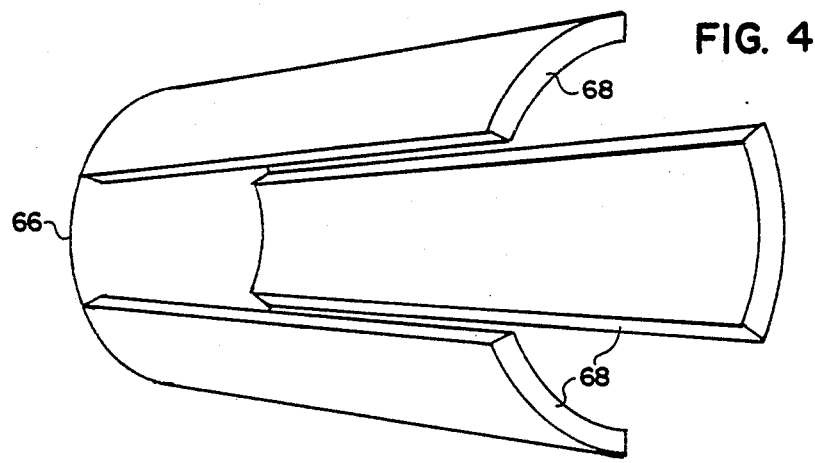
FIG. 4 illustrates a first plastic material component formed in an alternative embodiment of the method of the present invention.
Figure 5:
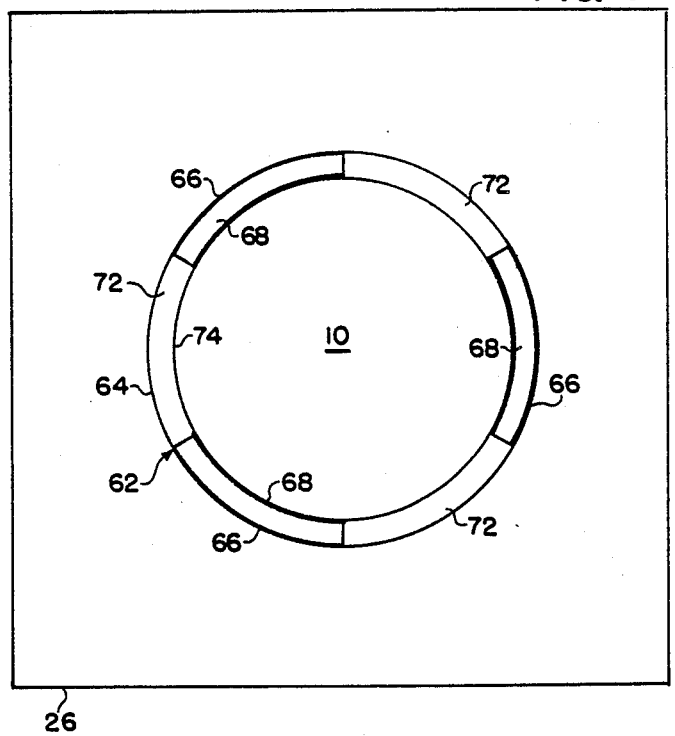
FIG. 5 is a sectional view illustrating a second mold cavity containing the first plastic material component of FIG. 4.

Referring to FIGS. 4 and 5, the method of the present invention also may be used for molding a product 62 having a side wall 64 including at least one approximately longitudinal strip that may be transparent to thereby provide a transparent window in the side wall 64.

In one embodiment, the first plastic material component 66 is shaped to provide at least one stabilizing region 68 that is transverse to a parting line 54 (FIG. 3C) between the first common mold part 10 and the first complementary mold part 12, whereby each longitudinal strip is defined by a transverse stabilizing region 68. The stabilizing regions 68 need not extend all the way to the parting line 54. A transparent window is provided in the side wall 64 by injecting a transparent first plastic material into the first mold cavity to provide the first plastic material component 66. A nontransparent second plastic material 72 is injected into the second mold cavity 74 to provide a nontransparent background for printing in the remainder of the side wall 64.

In an alternative embodiment, the first plastic material component 66 is shaped such that when the first plastic material component 66 is contained in the second mold cavity 74, the second mold cavity 74 defines at least one unfilled cavity region 72 that is transverse to a parting line 56 (FIG. 3A) between the first common mold part 10 and the second complementary mold part 26, whereby longitudinal strips may be provided in the unfilled transverse cavity regions 72. The unfilled transverse cavity regions 72 need not extend all the way to the parting line 56. In this embodiment, transparent windows are defined in the side wall 64 by injecting a transparent second plastic material into the second mold cavity 74 to fill the transverse cavity regions 72. Prior thereto, a nontransparent first plastic material is injected into the first mold cavity to form the first plastic material component 66 and thereby provide a nontransparent background for printing in the remainder of the side wall 64.

Figure 6:
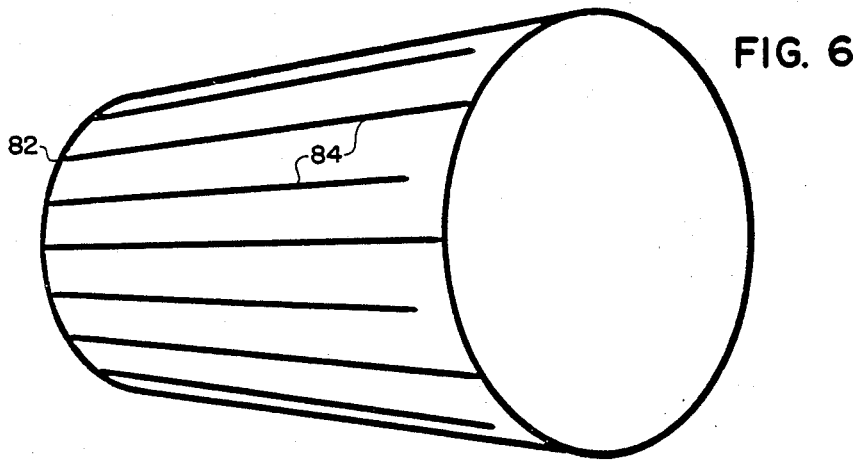
FIG. 6 illustrates a first plastic material component formed in a further alternative embodiment of the method of the present invention.
Figure 7:
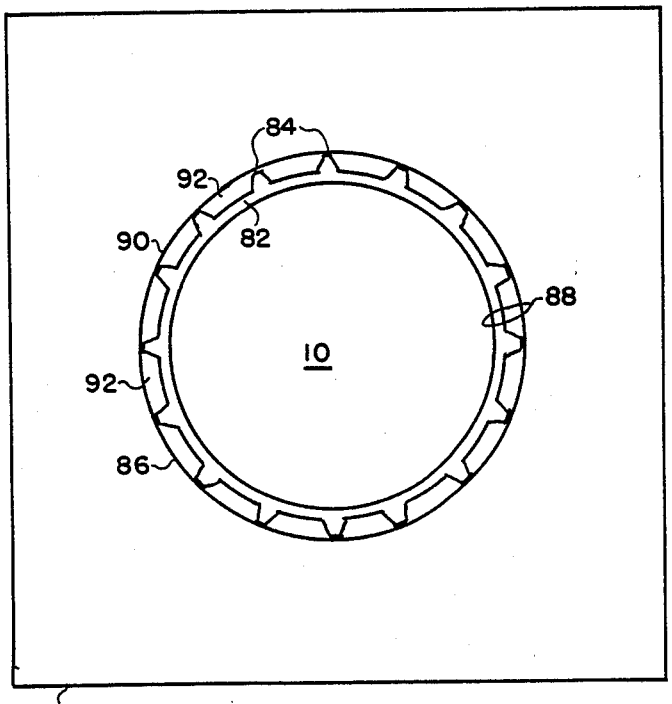
FIG. 7 is a sectional view illustrating a second mold cavity containing the first plastic material component of FIG. 6.

Referring to FIGS. 6 and 7, in a further preferred embodiment, the first plastic material component 82 that is shaped as shown in FIG. 6 to include a plurality of symmetrically disposed stabilizing regions 84, which extend approximately longitudinally over a portion of the side wall 86 of the molded product 88. The first plastic material component 82 is molded in a first mold cavity in accordance with the teaching of applicant's U.S. Pat. application No. 7,463, filed Jan. 26, 1987 and in accordance of the above description to the extent that such description is compatible with the teaching of application Ser. No. 7,463. After the first plastic material component 82 is formed in a first mold cavity, which is assembled by combining a first complementary mold part 12 and a first common mold part 10, the first plastic component 82 is retained on the first common mold part 10 while the first common mold part 10 is combined with a second complementary mold part 26 to assemble a second mold cavity 90, as shown in FIG. 7.

Referring to FIG. 7, the first plastic material component 82 is shaped such that when the first plastic material component 82 is contained in the second mold cavity 90, the first plastic material component 82 provides one or more stabilizing regions 84 that rigidly secure the first common mold part 10 in position in relation to the second complementary mold part 26 in order to impede movement of the first common mold part 10 in relation to the second complementary mold part 26 during injection of the second plastic material 92 into the second mold cavity 90.

The injected second plastic material 92 is solidified by cooling in the second mold cavity 90 to form a second plastic material component 92 that fuses with the first plastic material component 82 to produce the hollow, thin-walled, plastic product 88. The side wall 86 of the molded product 88 thus includes two layers of plastic 82, 92. The molded product 88 has controlled dimensions, is generally shaped as shown in FIG. 6, and has a lateral cross section as shown in FIG. 7. The side wall 86 of the molded product thus includes two layers of plastic 82, 92.

The stabilizing regions 84 have a wall thickness equal to the thickness of the side wall 86 and are transverse to the parting line 56 (FIG. 3A) between the first common mold part 10 and the second complementary mold part 26 to thereby provide longitudinal transparent windows 84 in the side wall 86. The stabilizing regions 84 need not extend all the way to the parting line 56. In a preferred embodiment of this product, the other side-wall layer 90 is nontransparent and extends throughout the majority of the side wall 86.

The present invention may be modified from the embodiments illustrated and described above. The common mold parts may be cavity mold parts instead of core mold parts, as illustrated and described herein. In addition, injections of plastic material into any given mold cavity may be made through more than one gate. Also, injections of plastic materials may be made into more than two mold cavities simultaneously, whereby the number of mold cavities included in the mold may be a multiple of the number of separate mold cavities required to produce a single product. For example, when using the method described and illustrated herein for producing a product composed of two plastic material components formed following injection of plastic material into two separate mold cavities, the number of mold cavities included in the mold may be any multiple of two, i.e. 2, 4, 6, etc.

The present invention also can be used to mold products including more than two plastic material components formed following injection of plastic material into more than two separate mold cavities. In an embodiment requiring three separate mold cavities, a third complementary mold part is used, and the fused first and second plastic material components are retained on the first common mold part when the first common mold part is combined with the third complementary mold part to assemble the third mold cavity, with the fused first and second mold parts being shaped to stabilize the common mold in relation to the third complementary mold part during injection of a third plastic material into the third mold cavity.

The core-stabilization techniques described in applicant's U.S. Pat. Nos. 4,381,275 and 4,508,676; U.S. Pat. No. 3,737,272 to Stegmuller; and in Australian Patent Specification 17,577/70 filed by Ryles and published Jan. 20, 1972 may be used to stabilize the common mold part in relation to the first complementary mold part during the injection of the first plastic material in lieu of the technique described above with relation to FIGS. 1A and 1B.

The first and second plastic materials may be either the same material or different materials. It is sometimes advantageous to use first and second plastic materials having different physical characteristics. For example, the present invention is ideally suited for molding a hollow, thin-walled plastic product in which the side wall must provide both a moisture barrier and a gas (such as Oxygen) barrier. To mold such a product, a plastic material having a desirable moisture-barrier characteristic is selected as one of the injected plastic materials; and a plastic material having a desirable gas-barrier characteristic is selected as the other injected plastic material.

I claim:

1. A method of cyclic injection molding a thin-walled hollow, plastic product having a closed end and an open end with laminated walls terminating in a rim at the open end, utilizing a first mold cavity and a second mold cavity, the first mold cavity being defined by a first common mold part and a first complementary mold part, and the second mold cavity being defined by the first common mold part and a second complementary mold part, the method comprising the steps of
    (a) combining the first common mold part with the first complementary mold part to assemble the first mold cavity;
    (b) injecting a first plastic material into the first mold cavity;
    (c) solidifying the injected first plastic material to form a first plastic material component;
    (d) combining the first common mold part with the second complementary mold part to assemble the second mold cavity with the first plastic material component attached to the first common mold part so that when the second mold cavity is assembled the first plastic material component is contained within the second mold cavity;
    (e) injecting a second plastic material having different characteristics than the first plastic material into the second mold cavity while the first plastic material component is contained therein; and
    (f) solidifying the injected second plastic material so as to form a second plastic material component that fuses with the first plastic material component to produce a hollow plastic product;
    wherein step (c) comprises the step of
    (g) shaping the first plastic material component such that when the first plastic material component is so contained in the second mold cavity the first plastic material component provides one or more stabilizing regions that rigidly secure the first common mold part in position in relation to the second complementary mold part in order to impede movement of the first common mold part in relation to the second complementary mold part during step (e), to thereby produce a thin-walled plastic product having controlled dimensions;
    wherein step (b) comprises the step of
    (h) injecting the first plastic material until it reaches the portion of the first mold cavity that defines the rim of the product; and
    wherein step (e) comprises the step of
    (i) injecting the second plastic material until it reaches the portion of the second mold cavity that defines the rim of the product.

2. A method according to claim 1 for molding a product having a side wall including an approximately longitudinal strip, wherein step (g) comprises shaping the first plastic material component to provide at least one said stabilizing region that is transverse to a parting line between the first common mold part and the first complementary mold part, whereby said longitudinal strip is defined by said transverse stabilizing region.

3. A method according to claim 2,
    wherein step (b) comprises injecting a said first plastic material that is transparent, whereby said strip defines a transparent window in the side wall; and
    wherein step (e) comprises injecting a said second plastic material that is nontransparent.

4. A method according to claim 1 for molding a product having a side wall including an approximately longitudinal strip, wherein step (g) comprises shaping the first plastic material component such that when the first plastic material component is contained in the second mold cavity, the second mold cavity defines at least one unfilled cavity region that is transverse to a parting line between the first common mold part and the second complementary mold part, whereby said longitudinal strip is defined by said unfilled transverse cavity region.

5. A method according to claim 4,
    wherein step (b) comprises injecting a said first plastic material that is nontransparent; and
    wherein step (e) comprises injecting a said second plastic material that is transparent, whereby said strip defines a transparent window in the side wall.

6. A method according to claim 1, for cyclic injection molding a plurality of thin-walled, hollow, plastic products, further utilizing a third mold cavity and a fourth mold cavity, the third mold cavity being defined by a second common mold part and the first complementary mold part, and the fourth mold cavity being defined by the second common mold part and the second complementary mold part, the method further comprising the steps of:
    (h) during step (d), combining the second common mold part with the first complementary mold part to assemble the third mold cavity;
    (i) during step (e), injecting a third plastic material into the third mold cavity;
    (j) during step (f), solidifying the injected third plastic material to form a third plastic material component;
    (k) during step (a), combining the second common mold part with the second complementary mold part to assemble the fourth mold cavity with the third plastic material attached to the second common mold part so that when the fourth mold cavity is assembled the third plastic material is contained within the fourth mold cavity;

(l) during step (b), injecting the fourth plastic material into the fourth mold cavity while the solidified third plastic material is contained therein; and (m) during step (c), solidifying the injected fourth plastic material so as to form a fourth plastic material component that fuses with the third plastic material to produce a second hollow plastic product;

wherein step (j) comprises the step of (n) shaping the third plastic material component such that when the third plastic material component is so contained in the fourth mold cavity the third plastic material component provides one or more stabilizing regions that rigidly secure the second common mold part in position in relation to the second complementary mold part in order to impede movement of the second common mold part in relation to the second complementary mold part during step (l), to thereby produce a second thin-walled plastic product having controlled dimensions.

7. A method according to claim 6, for producing said products having laminated walls, wherein step (b) comprises the step of (o) injecting the first plastic material until it reaches the parting line between the first common mold part and the first complementary mold part;

wherein step (e) comprises the step of (p) injecting the second plastic material until it reaches the parting line between the first common mold part and the second complementary mold part;

wherein step (i) comprises the step of (q) injecting the third plastic material until it reaches the parting line between the second common mold part and the first complementary mold part; and wherein step (l) comprises the step of (r) injecting the fourth plastic material until it reaches the parting line between the second common mold part and the second complementary mold part.

8. A method according to claim 6, wherein the first plastic material is the same as the third plastic material and the second plastic material is the same as the fourth plastic material.

9. A method according to claim 1, wherein step (g) further comprises providing a said first complementary mold part that is dimensioned in relation to the first common mold part such that when so combined with the first common mold part to assemble the first mold cavity, portions of the first complementary mold part contact portions of the first common mold part to rigidly secure the first common mold part in position in relation to the first complementary mold part in order to impede movement of the first common mold part in relation to the first complementary mold part during step (b).

10. A method according to claim 1, further comprising the step of (j) between steps (c) and (d), separating said first common mold part with the first plastic material component attached thereto from said first complementary mold part without dividing that portion of said first complementary mold part that defines the rim of the product.

* * * * *

(12) EX PARTE REEXAMINATION CERTIFICATE (8376th)
United States Patent
Sorensen

(10) Number: US 4,935,184 C1
(45) Certificate Issued: Jul. 5, 2011

(54) STABILIZED INJECTION MOLDING WHEN USING A COMMON MOLD PART WITH SEPARATE COMPLIMENTARY MOLD PARTS

(75) Inventor: Jens O. Sorensen, Rancho Santa Fe, CA (US)

(73) Assignee: Sorensen Research and Development, San Diego, CA (US)

Reexamination Request:
No. 90/008,775, Jul. 30, 2007
No. 90/008,976, Dec. 21, 2007

Reexamination Certificate for:
Patent No.: 4,935,184
Issued: Jun. 19, 1990
Appl. No.: 07/386,012
Filed: Jul. 27, 1989

Related U.S. Application Data

(63) Continuation of application No. 07/152,670, filed on Feb. 5, 1988, now abandoned.

(51) Int. Cl.
B29C 45/16 (2006.01)
B29C 45/36 (2006.01)

(52) U.S. Cl. .................. 264/246; 264/255; 264/328.8; 425/129.1

(58) Field of Classification Search .................. None
See application file for complete search history.

(56) References Cited

U.S. PATENT DOCUMENTS

| | | | |
|---|---|---|---|
| 2,288,187 A | 6/1942 | Gits et al. | |
| 2,298,365 A | 10/1942 | Gits et al. | |
| 2,348,665 A | 5/1944 | Von Gehr | |
| 2,492,973 A | 1/1950 | Millbrae et al. | |
| 2,510,091 A | 6/1950 | Millbrae et al. | |
| 2,544,140 A | 3/1951 | Millbrae et al. | |
| 2,565,803 A | 8/1951 | Danielson et al. | |
| 2,607,957 A | 8/1952 | Danielson et al. | |
| 2,609,570 A | 9/1952 | Danielson et al. | |
| 2,663,910 A | 12/1953 | Danielson et al. | |

(Continued)

FOREIGN PATENT DOCUMENTS

| | | |
|---|---|---|
| DE | 1850999 | 5/1962 |
| DE | 1 850 999 | 5/1962 |
| DE | 1232339 | 7/1967 |

(Continued)

OTHER PUBLICATIONS

Val Wright, New Vigor For Two–Shot Molding With Automation . . . Versatility . . . Ingenuity, Modern Plastics, May 1968, pp. 79–83, published in US.

(Continued)

*Primary Examiner*—Alan Diamond

(57) ABSTRACT

A process for injection molding plastic products having a closed end and an open end with laminated walls terminating in a rim at the open end. A first common mold part is combined with a first complementary mold part to assemble a first mold cavity in which the first plastic material is injected until it reaches the portion of the first mold cavity that defines the rim of the product. Portions of the first complementary mold part contact portions of the first common mold part to rigidly secure the mold parts in position in relation to each other in order to impede movement of the mold parts in relation to each other during injection of a first plastic material into the first mold cavity. The first plastic material is shaped such that when it is contained after solidification in a second mold cavity it provides one or more stabilizing regions that rigidly secure the first common mold part in position in relation to the second complementary mold part in order to impede movement of such mold parts in relation to each other during the injection of a second plastic material into the second mold cavity. A second plastic material having different characteristics than the first plastic material is injected until it reaches the portion of the second mold cavity that defines the rim of the product to form a laminated wall.

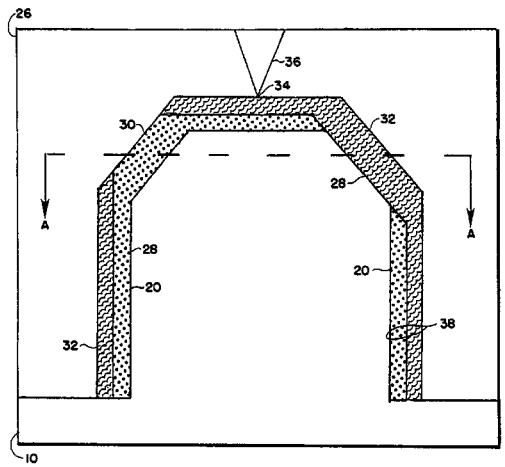

U.S. PATENT DOCUMENTS

| | | |
|---|---|---|
| 2,720,681 A | 10/1955 | Danielson et al. |
| 2,765,555 A | 10/1956 | Gits et al. |
| 2,863,241 A | 12/1958 | Gits |
| 3,016,579 A | 1/1962 | Schlizkus |
| 3,086,250 A | 4/1963 | Gits |
| 3,164,864 A | 1/1965 | Kobayashi |
| 3,178,497 A | 4/1965 | Moscicki |
| 3,375,554 A | 4/1968 | Blumer |
| 3,397,266 A | 8/1968 | Ayres |
| 3,466,700 A | 9/1969 | Harrison |
| 3,473,682 A | 10/1969 | Studen |
| 3,482,284 A | 12/1969 | Rees |
| 3,702,750 A | 11/1972 | Veneria |
| 3,718,944 A | 3/1973 | Clark |
| 3,773,450 A | 11/1973 | Svanfors |
| 3,807,920 A | 4/1974 | Aoki |
| 3,829,548 A | 8/1974 | Edwards |
| 3,914,031 A | 10/1975 | Sisler |
| 3,936,242 A | 2/1976 | Schrock et al. |
| 3,955,697 A | 5/1976 | Valyl |
| 3,995,008 A | 11/1976 | Spiegelberg |
| 4,047,873 A | 9/1977 | Farrell |
| 4,059,375 A | 11/1977 | Koch et al. |
| 4,128,381 A | 12/1978 | Bonis |
| 4,155,972 A | 5/1979 | Hauser et al. |
| 4,179,254 A | 12/1979 | Brown |
| 4,182,457 A | 1/1980 | Yamada et al. |
| 4,199,315 A | 4/1980 | Gallizia et al. |
| 4,242,391 A | 12/1980 | Reinhardt et al. |
| 4,264,295 A | 4/1981 | Hingley |
| 4,295,811 A | 10/1981 | Sauer |
| 4,347,209 A | 8/1982 | Suzuki |
| 4,364,896 A | 12/1982 | Kontz |
| 4,370,368 A | 1/1983 | Hirata et al. |
| 4,393,106 A | 7/1983 | Maruhashi et al. |
| 4,404,162 A | 9/1983 | Miki et al. |
| 4,410,595 A | 10/1983 | Matsumoto et al. |
| 4,422,995 A | 12/1983 | Schad |
| 4,422,998 A | 12/1983 | Sorensen |
| 4,438,065 A | 3/1984 | Brown |
| 4,440,820 A | 4/1984 | Shiho |
| 4,444,711 A | 4/1984 | Schad |
| 4,460,534 A | 7/1984 | Boehm et al. |
| 4,467,994 A | 8/1984 | Sorensen |
| 4,482,586 A | 11/1984 | Smith et al. |
| 4,486,378 A | 12/1984 | Hirata et al. |
| 4,491,752 A | 1/1985 | O'Hara et al. |
| 4,495,125 A | 1/1985 | Hatakeyama et al. |
| 4,508,676 A | 4/1985 | Sorensen |
| 4,511,610 A | 4/1985 | Yazaki et al. |
| 4,525,134 A | 6/1985 | McHenry et al. |
| 4,526,821 A | 7/1985 | McHenry et al. |
| 4,535,014 A | 8/1985 | Wright |
| 4,550,043 A | 10/1985 | Beck |
| 4,556,377 A | 12/1985 | Brown |
| 4,562,118 A | 12/1985 | Maruhashi et al. |
| 4,585,686 A | 4/1986 | Hasegawa et al. |
| 4,603,479 A | 8/1986 | Bergler |
| 4,609,516 A | 9/1986 | Krishnakumar et al. |
| 4,643,925 A | 2/1987 | Smith et al. |
| 4,662,426 A | 5/1987 | Scherer |
| 4,676,941 A | 6/1987 | Shiho et al. |
| 4,712,990 A | 12/1987 | Kudert et al. |
| 4,732,558 A | 3/1988 | Grannen, III |
| 4,743,422 A | 5/1988 | Kalriis-Nielsen et al. |
| 4,755,405 A | 7/1988 | Massucco et al. |
| 4,781,954 A | 11/1988 | Krishnakumar et al. |
| 4,789,326 A | 12/1988 | Sorensen |
| 4,794,975 A | 1/1989 | Volkmann |
| 4,837,115 A | 6/1989 | Igarashi et al. |
| 4,844,405 A | 7/1989 | Sorensen |
| 4,847,129 A | 7/1989 | Collette et al. |
| 4,856,977 A | 8/1989 | Von Holdt |
| 4,871,009 A | 10/1989 | Volkmann |
| 4,885,121 A | 12/1989 | Patel |
| 4,895,504 A | 1/1990 | Kudert et al. |
| 4,935,184 A | 6/1990 | Sorensen |
| 4,936,473 A | 6/1990 | Nahill et al. |
| 4,942,008 A | 7/1990 | Cahill |
| 4,978,493 A | 12/1990 | Kersemakers et al. |
| 5,020,187 A | 6/1991 | Kosten et al. |
| 5,045,268 A | 9/1991 | Sorensen |
| 5,049,343 A | 9/1991 | Sorensen |
| 5,067,887 A | 11/1991 | Speer et al. |
| 5,099,545 A | 3/1992 | Krasznai et al. |
| 5,252,664 A | 10/1993 | Thompson et al. |
| 5,348,815 A | 9/1994 | Barker |
| 5,484,567 A | 1/1996 | Niino et al. |
| 5,571,541 A | 11/1996 | Ochsenbein et al. |
| 5,663,011 A | 9/1997 | Bunyea et al. |
| 6,096,254 A | 8/2000 | Nielsen |
| 6,153,838 A | 11/2000 | Wadge |
| 6,170,579 B1 | 1/2001 | Wadge |
| 6,176,322 B1 | 1/2001 | Wadge |
| 6,224,471 B1 | 5/2001 | Clowers et al. |
| 6,286,611 B1 | 9/2001 | Bone |
| 6,588,992 B2 | 7/2003 | Rudolph |
| 6,705,807 B1 | 3/2004 | Rudolph et al. |
| 6,854,880 B2 | 2/2005 | Hsieh |
| 7,069,968 B2 | 7/2006 | Thomas et al. |
| 7,108,028 B2 | 9/2006 | Thomas |
| 2006/0120090 A1 | 6/2006 | Wikle et al. |

FOREIGN PATENT DOCUMENTS

| | | |
|---|---|---|
| DE | 3413113 | 10/1984 |
| EP | 0087607 | 7/1983 |
| FR | 2077184 | 10/1971 |
| FR | 2305948 | 10/1976 |
| GB | 1477074 | 6/1977 |
| GB | 2 004 494 | 4/1979 |
| GB | 2004494 A | 4/1979 |
| GB | 2004494 B | 5/1985 |
| JP | S52-51449 | 4/1977 |
| JP | 54022481 | 2/1979 |
| JP | 55-071541 | 5/1980 |
| JP | 55-095548 | 7/1980 |
| JP | 56-141324 | 11/1981 |
| JP | 58-82401 | 5/1983 |
| JP | 59073930 | 4/1984 |
| JP | 59-199227 | 11/1984 |
| JP | 59199227 | 11/1984 |
| JP | 60-119520 U | 8/1985 |
| JP | 60-119520 | 8/1985 |
| JP | 60154022 | 8/1985 |
| JP | 60-154022 | 8/1985 |
| JP | 61-47223 | 3/1986 |
| JP | 62-279911 | 12/1987 |
| JP | 5-212267 | 8/1993 |
| JP | 52-51449 | 9/1993 |
| WO | WO-87/01329 | 3/1987 |

OTHER PUBLICATIONS

Advertisement, VictorTech, http://www.victech.com/museumFile/oldadsbig.html/28.html.

Beck, Plastic Product Design, Van Nostrand Reinhold Co., Inc., Litton Educational Publishing Co., 1970, pp. RESP 00112–00113.

Company Brochure, Krauss Maffei Wegmann GmbH & Co KG, Multi–Colour Injection Molding Machines for Thermoplastic Processing, Germany.

Company Brochure, Krauss Maffei Wegmann GmbH & Co KG, Multi–Colour Injection Moulding Machines for the Processing of Thermoplastic Materials, Germany.

Dubois, Plastics, Van Nostrand Reinhold Co., Fifth Ed. (Litton Educational Publishing Co. 1974). (Preface only).

Dubois et al., Plastics Mold Engineering Handbook, Fourth Ed., 430–435, Van Nostrand Reinhold Co., Inc., 1987, pp. 430–435.

DYM, Plastics Mold Design: Nature of Plastics, Injection Molds and Molding, 1987 Van Nostrand Reinhold, Australia, p. 5.

Enhanced Material Characteristics at No Additional Cost, http://www.plasticdipmoldings.com/choices.htm, 2001, Plastic Dip Moldings, Inc., Plumtoadsville, PA.

Evans, Two Colour Molding, Angles on Injection, European Plastic News, 1982.

Fassett, Injection Molding: Thin Wall Molding: How Its Processing Considerations Differ From Standard Injection Molding, Plastics Engineering, pp. 35–37, 1995.

Garcia–Rejon et al., Modeling of the Filing and Cooking States in Thin Wall Injection Moulding, Antec '89, 348–351, 1989.

Glanville et al., Principal Types of Injection Mould, The Machinery Publishing Co., Ninth ed., 1965, pp. preface and pp. 146–149.

Jensen, Multicolored motor vehicle lenses—an example of excellent integration methods, Krauss Maffei Kunstoffechnik Journal, pp. 13–15, vol. 16, Germany, 1986.

Modern Plastics International, McGraw–Hill Publication, 1980, p. 34.

New Vigor for Two–Shot Molding, Modern Plastics, pp. 78–83, vol. 45–9, McGraw–Hill Publication, 1968.

Olmstead, Injection Molding, 1974–1975 Modern Plastic Encyclopedia, pp. 384–410.

Rohiffs, Plastics Machining: Understanding the Basics, Medical Plastics, Medical Devicelink, 2002, pp. 5–6.

Rosato et al., Injection Molding Handbook: The Complete Molding Operation Technology, Performance, Economics, Van Nostrand Reinhold Co., Inc., New York, 1986, pp. 49 page document.

Rosato, Rosato's Plastics Encyclopedia and Dictionary, 100, Oxford University Press, New York, 1993, p. 100.

Steele, Two Color Molding, Section V Finishing Operations, Exploring the World of Plastics, Glencoe Publishing Company, Missions Hills CA, 1977, pp. 336–337.

Sumitomo Heavy Industries, Ltd., Promal 100–100/100 Sumitomo–Nestal Dual Material Injection Molding Machine.

Schwartz, Plastics Materials and Processes, pp. 558–559, Van Nostrand Reinhold Co. Inc., 1982.

Thoma, Rationalisation through Multi–component Injection Moulding, Kunststoffe 78, 1988, vol. 8, pp. 665–669, Hanser Publisher, Munich.

Three Color Molder Solves Production Problems, Plastics World, Sep. 1979, pp. 34–35.

Two Color Parts On A Husky Mfg. & Tool Works, Ltd., Modern Platics, McGraw–Hill Publication, 1968.

Two–Color Injection Molding Machine Uses A Common Machine Base, Modern Plastics, McGraw–Hill Publication, 1967.

Vertical Clamp Offers New Possibilities, Mordern Plastics Inter'l, pp. 24 and 28, 1986.

Response to Official Communication regarding European Patent Application No. 89902989.6–2311/US8900466 dated Nov. 13, 1992.

Office Action for European Patent Application No. 89902989.6–2311/US8900466 dated May 13, 1992.

International Preliminary Examination Report for PCT/US89/00466 dated May 14, 1990.

International Search Report for PCT/US89/00466 dated May 17, 1989.

European Search Report on European Application No . EP 89 90 2989 dated Jul. 31, 1991.

Decision to Grant A European Patent Pursuant to Article 97(2) EPC for European Application No. 89902989.6–2309 429448 dated Mar. 3, 1994.

Office Communication regarding European Patent Application No. 89902989.6–2311/US8900466 dated Sep. 18, 1991.

"Multicomponent Injection Molding", Plastics Machinery & Equipment, p. 16, Jan. 1978.

Joint Order Entering Stay in Sorensen Cases, May 7, 2010, *Jens Erik Sorensen* v. *Giant International (USA) Ltd., et al.*, U.S. District Court for the Southern District of California, Case No. 3:08–cv–01256–BTM–CAB.

Sumitomo Heavy Industries, Ltd. *Promat 100–100/100 Sumitomo–Netstal Dual Material Injection Molding Machine*.

Wright, "New Vigor for Two–Shot Molding with Automation," *Modern Plastics*, vol. 45, No. 9, May 1968, pp. 78–83.

Plaintiff's Amended Preliminary Claim Constructions and Extrinsic Evidence, *Sorensen* v. *The Black & Decker Corporation et al.*, U.S. District Court for the Southern District of California, Case No. 06–cv–1572 BTM (CAB).

*Sorensen* v. *International Trade Com'n.*, 427 F.3d 1375 (Fed. Cir. 2005).

Plaintiffs' Local Civil Rule 56.1 Statement of Material Facts in Opposition to Defendants' Motion for Summary Judgment of Invalidity Based on Prior Art, U.S. District Court for the District of New Jersey Newark Vicinage, CIV. No. 03–1763(HAA).

Deposition of Paul P. Brown, Dec. 19, 2006, *Sorensen* v. *The Black & Decker Corporation et al.*, U.S. District Court for the Southern District of California, Case No. 06–cv–1572 BTM (CAB).

Diebel, Hermann, "Multicolor Injection Molding—Machines, Tools, Feasibility", Plastverarbeiter, vol. 27 (1976), No. 11.

Jensen, Rainer. "Turn–key System for the Production of Rear Lights for Automobiles", Plastverabeiter, vol. 39 (1988), No. 9.

Document Title: Reply Memorandum of Law in Support of Defendants' Motion for Reargument; Case Title: *Jens E. Sorensen, as Trustee of the Sorensen Research and Development Trust, and Jens Ole Sorensen, and individual, (plaintiffs)* v. *Daimlerchrysler AG, a German Corporation, and Mercedes–Benz USA, LLC, a Deleware Limited Liability Company, (defendants)*; filed: Sep. 3, 2004; Case No. 2:03–cv–01763–HAA–MF; Court: United States District Court District of New Jersey Newark Vicinage.

Document Title: Memorandum of Law in Opposition to Plaintiffs' Motion for Reargument; Case Title: *Jens E. Sorensen, as Trustee of the Sorensen Research and Development Trust, and Jens Ole Sorensen, and individual, (plaintiffs)* v. *DaimlerCrysler AG, a German Corporation, and Mercedes–Benz USA, LLC, a Deleware Limited Liability Company, (defendants)*; Filed: Aug. 30, 2004; Case No. 2:03–cv–01763–HAA–MF; Court: United States District Court District of New Jersey Newark Vicinage.

Document Title: Defendants' Notice of Motion for Reargument; Case Title: *Jens E. Sorensen, as Trustee of the Sorensen Research and Development Trust, and Jens Ole Sorensen, and individual, (plaintiffs)* v. *Daimlerchrysler AG, a German Corporation, and Mercedes–Benz USA, LLC, a Deleware Limited Liability Company, (defendants)*; Filed: Aug. 4, 2004; Case No. 2:03–cv–01763–HAA–MF; Court: United States District Court District of New Jersey Newark Vicinage.

Plaintiffs's Memorandum of Law in Opposition to Defendants'Motion for Summary Judgement of Invalidity Based on Prior Art, *Sorenson* v. *Daimlerchrysler AG*, U.S. District Court for the District of New Jersey, Case No. CIV. No. 03–1763 (HAA).

Declaration of Paul P. Brown in Support of Plaintiffs' Opposition to Defendants' Motion for Summary Judgment of Invalidity Based on Prior Art, May 14, 2004, *Sorenson* v. *DaimlerChrysler AG*, U.S. District Court for the District Court for the District of New Jersey; Case No. Civ. No. 03–1763 (HAA).

Plaintiffs' Local Civil Rule 56.1 Statement of Material Facts in Opposition to Defendants' Motion for Summary Judgement of Invalidity Based on Prior Art, *Sorenson* v. *Daimlerchrysler AG*, U.S. District Court for the District of New Jersey, Case No. CIV. No. 03–1763 (HAA).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1 and 6-10 is confirmed.

Claims 2 and 4 are cancelled.

Claims 3 and 5 were not reexamined.

* * * * *